UNITED STATES PATENT OFFICE.

HERMAN L. HARTENSTEIN, OF CHICAGO, ILLINOIS, ASSIGNOR, BY MESNE ASSIGNMENTS, TO ELECTRO CHEMICAL & DEVELOPMENT COMPANY, OF PIERRE, SOUTH DAKOTA, A CORPORATION OF SOUTH DAKOTA.

SUPERHEATING COMPOUND.

No. 819,218.   Specification of Letters Patent.   Patented May 1, 1906.

Application filed July 23, 1902. Renewed September 30, 1905. Serial No. 280,723.

*To all whom it may concern:*

Be it known that I, HERMAN L. HARTENSTEIN, a citizen of the United States, residing at Chicago, in the county of Cook and State of Illinois, have invented a new and useful Superheating Compound, of which the following is a specification.

This invention relates to superheating compounds.

The object of the invention is to provide a superheating compound for use in raising and maintaining the temperature of materials while under treatment in the manufacture of calcium carbid.

In a copending application executed of even date herewith, I have set forth, described, and claimed a method of manufacturing calcium carbid direct from limestone or lime-bearing material or ore by preheating the limestone or lime-bearing substance to calcine the same, then mixing carbonaceous material with the mass while in a highly-heated condition, and finally delivering or distributing the heated mass or mixture to electric or other furnaces, where it is fused or reduced to melted condition to form carbid. In the most economical operation of the process it is desirable to conserve as much as possible the heat of the mass or material under treatment in one step of the process, so that the same may be utilized to the greatest possible advantage in the next succeeding step. This is particularly desirable during the operation of distributing the heated mass from the preheating or mixing furnace to the electric or other furnaces—that is to say, during the calcining or preheating operation the material under treatment is raised to a temperature of incandescence and it is desirable that the mass retain this heat while being distributed to the electric or other furnaces, so that a smaller amount of electric current is required to effect the fusing or melting of the mass. It is the special purpose of the present invention to provide a superheating compound which possesses the property of readily yielding up heat when added to the heated mass, thereby raising the temperature of the mass and enabling the mass to retain its high temperature while being distributed or delivered to the electric or other furnaces. Moreover, limestone or lime-bearing ore or substances frequently contain more or less phosphorus, and the presence of any phosphorus in the finished product or carbid is exceedingly objectionable. Therefore I propose to employ a superheating compound which also drives off or expels any phosphorus that may be present. In carrying out my invention, therefore, I propose to provide a superheating compound which not only possesses the property of readily yielding or producing heat, but which will also drive off or expel any phosphorus that may be present in the mass of material under treatment.

I have found that a compound of the following ingredients and in substantially the proportions, by weight, given satisfactorily answers the purpose: calcium carbid, sixty per cent.; black oxid of manganese, twenty per cent.; bituminous coal, fifteen per cent.; aluminium, three per cent.; chlorate of potash, two per cent. I do not desire, however, to be limited or restricted to the exact proportions stated, as the same may be varied throughout a wide range and according to the quality and character of the limestone or other materials employed. I have found that the proportions stated, however, are satisfactory under ordinary conditions.

In making up this compound I prefer to reduce the various elements to pulverized or granular condition and then thoroughly mix the same together, and for the carbid the ordinary "fines" from the crushers, and which are unfit for other or commercial purposes, may be used.

In the use of this compound for superheating purposes the calcium carbid serves when heated to produce a high tempertaure, while the black oxid of manganese gives off oxygen, which promotes the burning of the carbid. The aluminium combines with carbon monoxid or with carbon dioxid, according to the following formulæ:

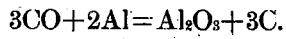

$$3CO + 2Al = Al_2O_3 + 3C.$$

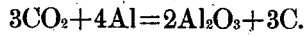

$$3CO_2 + 4Al = 2Al_2O_3 + 3C.$$

Possibly some trace of aluminium carbid is produced; but its presence is of no consequence. The aluminium serves to expel or drive off any phosphorus that may be present.

The phosphorus occurs mainly as an impurity in the coke, generally in the form of the oxid $P_2O_5$ or the phosphate $P_2O_5 3CaO$, which would be reduced in the electric furnace to the oxid as follows:

$$2P_2O_5 3CaO + 9C = 2P_2O_5 + 6CO + 3Ca_2C.$$

The aluminium acts to combine with the phosphorus and form a slag, as follows:

$$P_2O_5 + 2Al + 3O = Al_2O_3 P_2O_5.$$

I do not desire to be limited or restricted to the exact ingredients specified, as other equivalents may be substituted with equally good results. Neither do I desire to be limited to the use of this superheating compound for the manufacture of carbid, as it may be found useful for other purposes and manufactures.

When used in the manufacture of carbid, as explained in my copending application, above referred to, the limestone is first heated to a high degree and then carbonaceous material is mixed therewith and the mixture heated to incandescence. The superheating compound is then added to the heated mass and immediately thereafter the mass is delivered into a distributing vat or tank, and thence while still in a heated state to the electric or other furnaces, the superheating compound serving to maintain or retain the high temperature of the mass while being delivered into the distributing tank or vat and therefrom to the electric or other furnaces.

It is obvious that the superheating compound may be introduced during or after the delivery of the mass to the distributing vat or tank.

Having now set forth the object and nature of my invention, what I claim as new and useful and of my own invention, and desire to secure by Letters Patent, is—

1. In the manufacture of calcium carbid, a superheating compound comprising calcium carbid, carbon, an oxygen-producing substance, and a metallic element, as and for the purpose set forth.

2. A superheating compound of the character described, comprising a mixture of calcium carbid, black oxid of manganese, bituminous coal, aluminium and chlorate of potash, as and for the purpose set forth.

3. A superheating compound of the character described, comprising a mixture of the following ingredients when pulverized or granulated and in the proportions specified: calcium carbid, black oxid of manganese, bituminous coal, aluminium, and chlorate of potash, as and for the purpose set forth.

4. In the manufacture of calcium carbid, a superheating compound comprising calcium carbid and carbon, intermixed with oxygen-producing substances and aluminium, as and for the purpose set forth.

5. A superheating compound comprising calcium carbid carbon, oxid of mangenese and chlorate of potash, as and for the purpose set forth.

In witness whereof I have hereunto set my hand, this 14th day of July, 1902, in the presence of the subscribing witnesses.

HERMAN L. HARTENSTEIN.

Witnesses:
E. C. SEMPLE,
S. E. DARBY.